United States Patent [19]
Lee et al.

[11] Patent Number: 5,838,937
[45] Date of Patent: Nov. 17, 1998

[54] DATA TRANSMITTING/RECEIVING METHOD USING DISTRIBUTED PATH CONTROL IN DATA SWITCHING SYSTEM

[75] Inventors: Hyeun Tae Lee; Keun Woo Lee, both of Daejeon, Rep. of Korea

[73] Assignee: Electronics and Telecommunications Research Institute, Daejeon, Rep. of Korea

[21] Appl. No.: 754,091

[22] Filed: Nov. 20, 1996

[30] Foreign Application Priority Data

Dec. 23, 1995 [KR] Rep. of Korea .................. 1995-55866

[51] Int. Cl.⁶ ............................ H04Q 11/04; G06F 13/00
[52] U.S. Cl. ......................... 395/311; 395/312; 370/351; 370/360
[58] Field of Search ..................... 395/311, 312; 340/825.79; 370/351, 352, 357, 360, 362, 363, 389, 449

[56] References Cited

U.S. PATENT DOCUMENTS

| | | | |
|---|---|---|---|
| 4,484,324 | 11/1984 | Orsic | 370/50 |
| 4,488,290 | 12/1984 | Dunn et al. | 370/66 |
| 5,072,217 | 12/1991 | Georgiou et al. . | |
| 5,140,585 | 8/1992 | Tomikawa | 370/60.1 |
| 5,179,669 | 1/1993 | Peters . | |
| 5,347,516 | 9/1994 | Yoshida | 370/94.1 |
| 5,396,638 | 3/1995 | Kanekura | 395/325 |
| 5,420,853 | 5/1995 | McRoberts et al. | 340/825.5 |
| 5,432,782 | 7/1995 | Suzuki | 370/60 |
| 5,590,355 | 12/1996 | Shichiku et al. | 395/800 |
| 5,600,647 | 2/1997 | Murai | 370/363 |
| 5,619,722 | 4/1997 | Lovrenich | 395/281 |
| 5,689,644 | 11/1997 | Chou et al. | 370/352 |

Primary Examiner—Meng-AI T. An
Assistant Examiner—Xuan M. Thai
Attorney, Agent, or Firm—Antonelli, Terry, Stout & Kraus, LLP

[57] ABSTRACT

A data transmitting/receiving method using distributed path control in a data switching system is disclosed, including the steps of: (1) storing data by distributing a first code and a last code of a received data frame, and then reading and storing a frame header; requesting a path setting and then initializing a trial number; transmitting a setup request signal in the next time slot with a destination port address if a polling address is its own address, and thus transmitting the stored header through a data channel when the response signal received from the destination output port indicates an end of the path controlling operation; and transmitting data stored in an input buffer to the end of a frame and requesting a path release at its polling address; (2) releasing the path in case of path release request when the destination port address is its own port address; if the output port is not in use, the output buffer is not is a full state, and a communication channel is available, indicating the end of the path controlling operation in a response bus in case of the path setup request and receiving a switch path setup data to discriminate an initial code and last code of the frame, thereby transmitting the data.

4 Claims, 10 Drawing Sheets

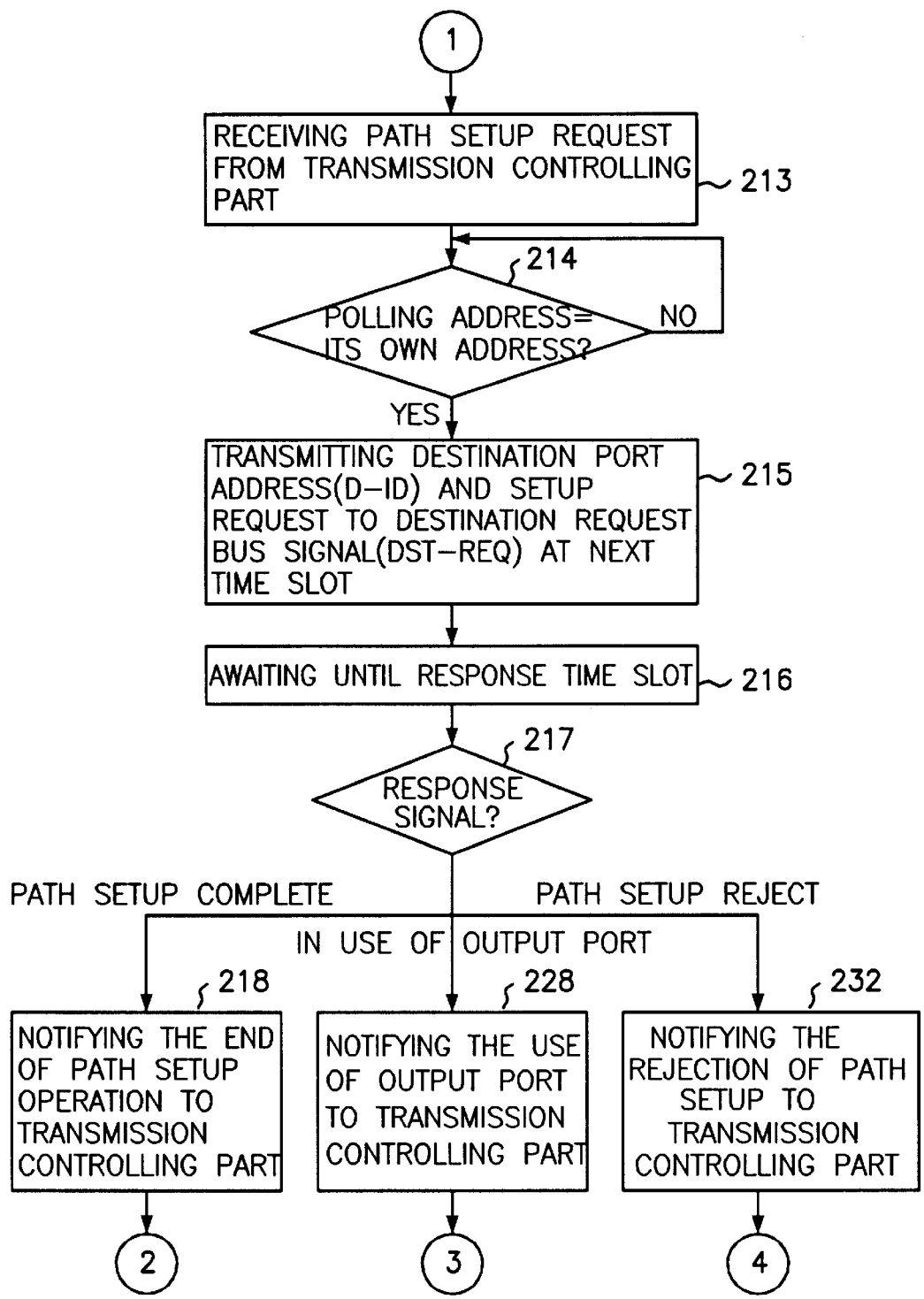

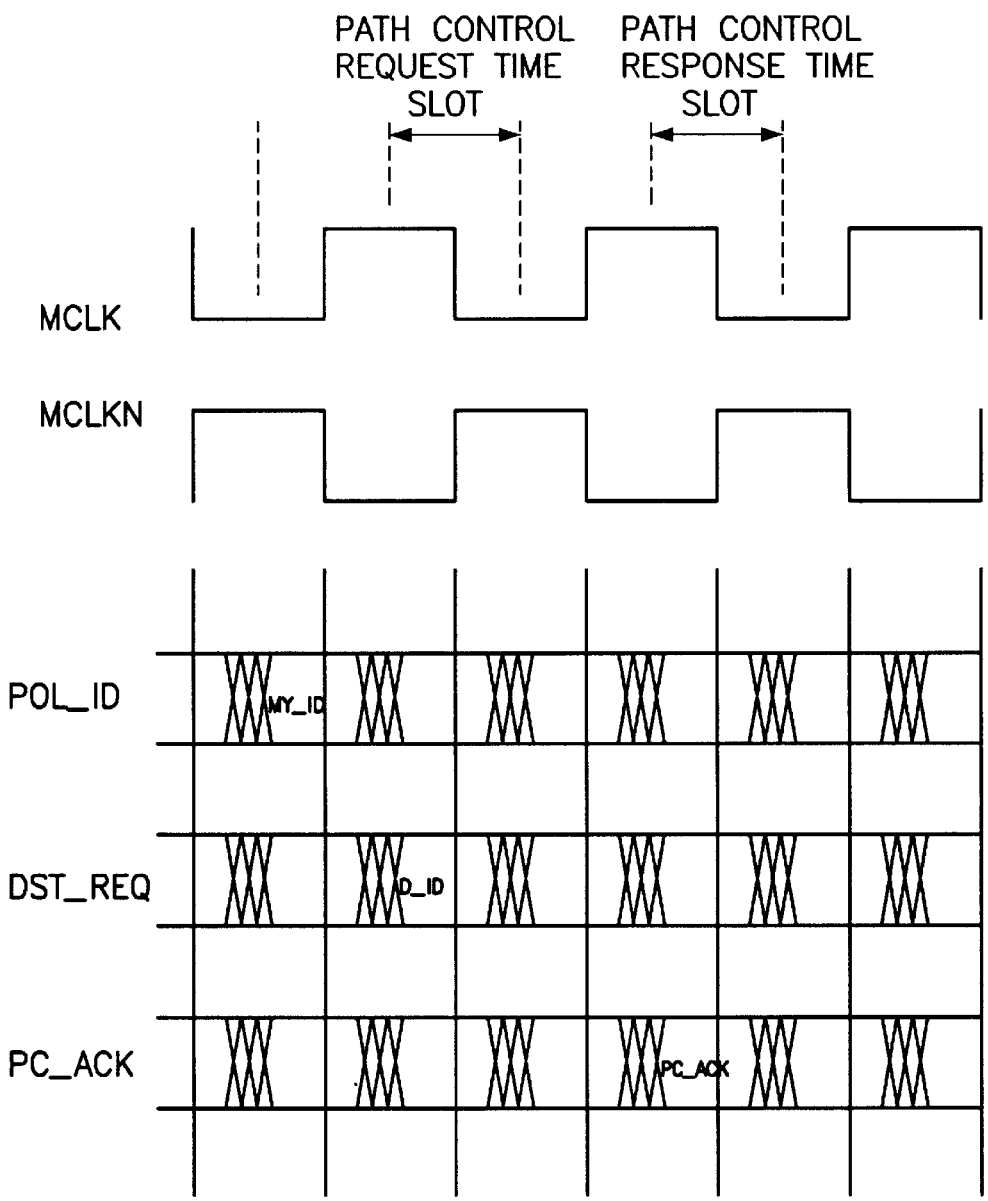

DATA TRANSMITTING/RECEIVING METHOD USING DISTRIBUTED PATH CONTROL IN DATA SWITCHING SYSTEM

BACKGROUND OF THE INVENTION

The present invention relates to a data transmitting/receiving method using a distributed path control in a data switching system with a plurality of communication ports.

For transmitting large-scaled data for a multi-computer system, multi-processor system and computer clustering, a high-speed data switching system is needed between unit computer systems or processor systems. Therefore, the performance of the high-speed data switching system is an important factor in structuring the entire system. And when structuring this kind of data switching system, an internal non-blocking switch is used for enhancing the performance of the system.

The internal non-blocking switch guarantees that there will be no collision in the path of the switch and thus provides an independent path between the input and output. Therefore, as long as the path is set up, a full bandwidth inside the medium is guaranteed. For a prominent example of the non-blocking, there is a crossbar switch. However, if a plurality of input ports are requested to be connected to one output port, collisions occur in the output port because the simultaneous connection in pairs is not available. Thus, a means is needed to arbitrate the connection between a plurality of input ports and one output port.

For this kind of output port arbitration method, there are two methods: one is a centralized arbitration method; and the other is a distributed arbitration method.

The centralized arbitration method is structured so that the path connection requests from all input ports are processed in one centralized arbitration device. Therefore, if the performance of the centralization mediating device is not enough to process all of the path connection requests and there are simultaneous requests for setting up a plurality of paths, the path connection may be delayed.

In addition, this structure is limited in extending the system such that if the number of ports is intended to be increased, the size of the arbiter must be increased. Thus, since an error of one arbiter causes an incorrect operation of the entire system, this method is also disadvantageous in its reliability.

Meanwhile, the distributed arbitration method performs the arbitration function in module units or output ports in parallel, so that this method is advantageous in its performance and reliability.

But, in implementing this distributed arbitration method, a problem occurs in that the communication medium is complicated to request the path connection from all input ports to the distributed arbitration device, and transmit the path-connection response from the distributed arbitration device to the-corresponding input port. That is, a connection control line is needed between all of the input ports and all of the distributed arbitration devices. Thus, if the number of ports is n, $n^2$ path connection request signal lines and $n^2$ path connection response signal lines are needed. Such a signal line has a problem when the number of ports is large, because the cost of implementing hardware also increases.

When the number of the ports n, that is the dimension of the data switching system, increases, the connection medium between the input port and distribution mediating device should be re-designed. In other words, additional signal lines of the connection medium corresponding to the size of the extended system are needed.

In general, the destination address of the data frame is used for switching the data frame through the data switching system. The destination address is different from the physical port number of the data switching system. Therefore, the physical port address corresponding to the destination address is needed for routing the data switching system. When considering the construction in which the path setup request signal line is connected from all input ports to all distributed arbitration devices in the distributed arbitration method, the logical address of the output port included in the input frame of each input port is analyzed and converted into the physical address. As a result, this kind of method is disadvantageous in that the address conversion should be performed using an address look-up table in each input port.

The data switching system using a commercial crossbar switch has the following drawback. When controlling a single crossbar switch, the crossbar switch can connect or cut only one crossbar junction point once. Therefore, if the request for the crossbar junction point is simultaneously input from a plurality of arbitration devices, collisions occur in controlling the crossbar junction point even though the mediating function is distributed in an output port, and thus delays the connection.

SUMMARY OF THE INVENTION

An object of the invention is to solve the conventional problems and to provide a data transmitting/receiving method using distributed path control in a data switching system with a plurality of communication ports.

The invention to achieve the object includes the steps of:
storing data by discriminate a start code and an end code of a received data frame, and then reading and storing a frame header; requesting a path setting; transmitting a setup request signal in the next time slot with a destination port address if a polling address is its own address, and thus transmitting the stored header through a data channel when the response signal received from the destination output port indicates the success of the path controlling operation; and transmitting data stored in an input buffer to the end of a frame and requesting a path release at its polling address; (2) releasing the path for a path release request when the destination port address is its own port address; if the output port is not in use, the output buffer is not in a full state, and inter communication is available, marking the success of the path controlling operation in a path controlling response bus for the path setup request and receiving data via a set up switch path data to discriminate a start code and end code of the frame, thereby transmitting the data.

BRIEF DESCRIPTION OF THE ATTACHED DRAWINGS

FIGS. 4A–4D are flowcharts showing a data transmission step according to one embodiment of the invention;

FIG. 6 is a timing chart of a path control bus of the invention.

DETAILED DESCRIPTION OF PREFERRED EMBODIMENT

With reference to the attached drawings, a preferred embodiment of the invention will be described in detail.

Figure 1:
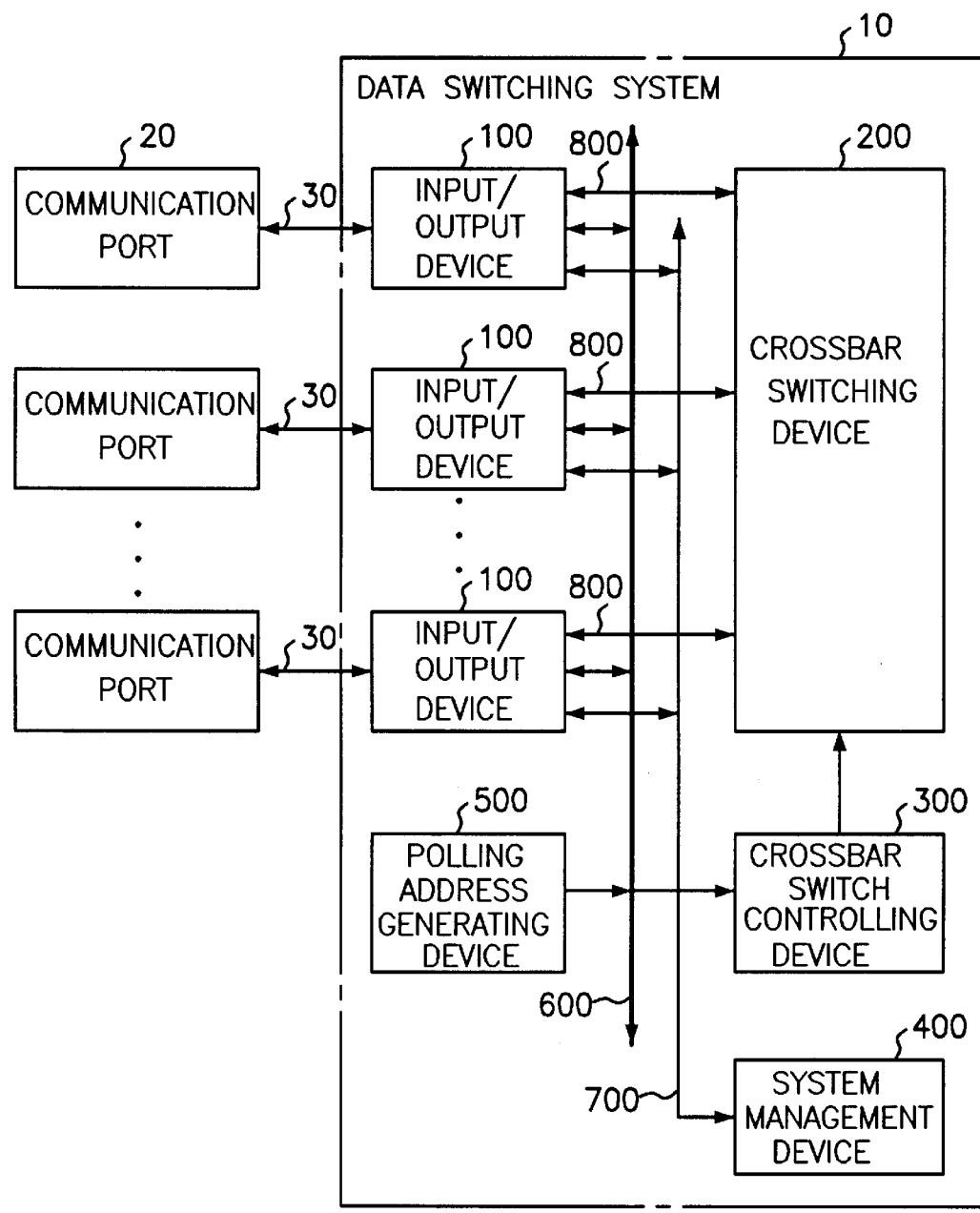
FIG. 1 is a block diagram of a data switching system of the invention.

As illustrated in FIG. 1, a data switching system 10 includes: an input/output device 100, a communication terminal of which is connected through a communication link 30 to provide an intercommunication channel between a plurality of communication ports 20; a crossbar switching device 200 to provide a data path between the data channels 800 of each input/output device 100; a crossbar switch controlling device 300 to control the connection of the crossbar switching device 200; a path controlling bus 600 to exchange a path controlling signal between the input/output devices 100; a polling address generating device 500 to generate a polling port address of the path controlling bus; and a system management device 400 to adjust each input/output device 100 and manage the system.

The communication port 20 can include a computer, disk device, various input/output devices, and modularized unit processor. A transmission link 30 between the communication port and the input/output device 100 is a bi-directional communication link, and can be implemented by an optical fiber transmission line, Co-ax or Twisted pair media.

For serial transmission, the parallel data is converted into serial data in the communication port 20, and the electrical signal needs to be converted into an optical signal when the transmission medium is an optical fiber. Data generated in the communication port includes a frame having the origination port address and destination port address.

The data switching system sets up the path of the data by using the origination port and destination port address. The method transmitting the frame provides a method for discriminating the start and end points of the frame. For example, Fibre channel standard(FCS) standardized at ANSI X3T11 uses a 8B/10B coding method. When using the 8B/10B coding method, the start and end points are discriminated by using a specific code (generally, called "comma character") not shown in any serial pattern.

The frame transmitted through the transmission link 30 obtains the destination address by examining the header of the frame and requests the crossbar switch paths between the origination port and destination port using the address.

The crossbar switching device 200 provides an internal non-blocking data path between the input port and output port. That is, in the crossbar switching device 200, the path whose output port is different from each other has no collision in the switch. But, the data channel 800 having one output port can be connected to only one path at a time, and thus when the simultaneous path setup from a plurality of input ports to the corresponding output port is requested, an output port collision is generated therein. Therefore, an arbitration device is required to solve the output port collision.

The invention provides a path controlling structure and its method in the design in which the arbitration function is distributed by the output unit.

Figure 2:
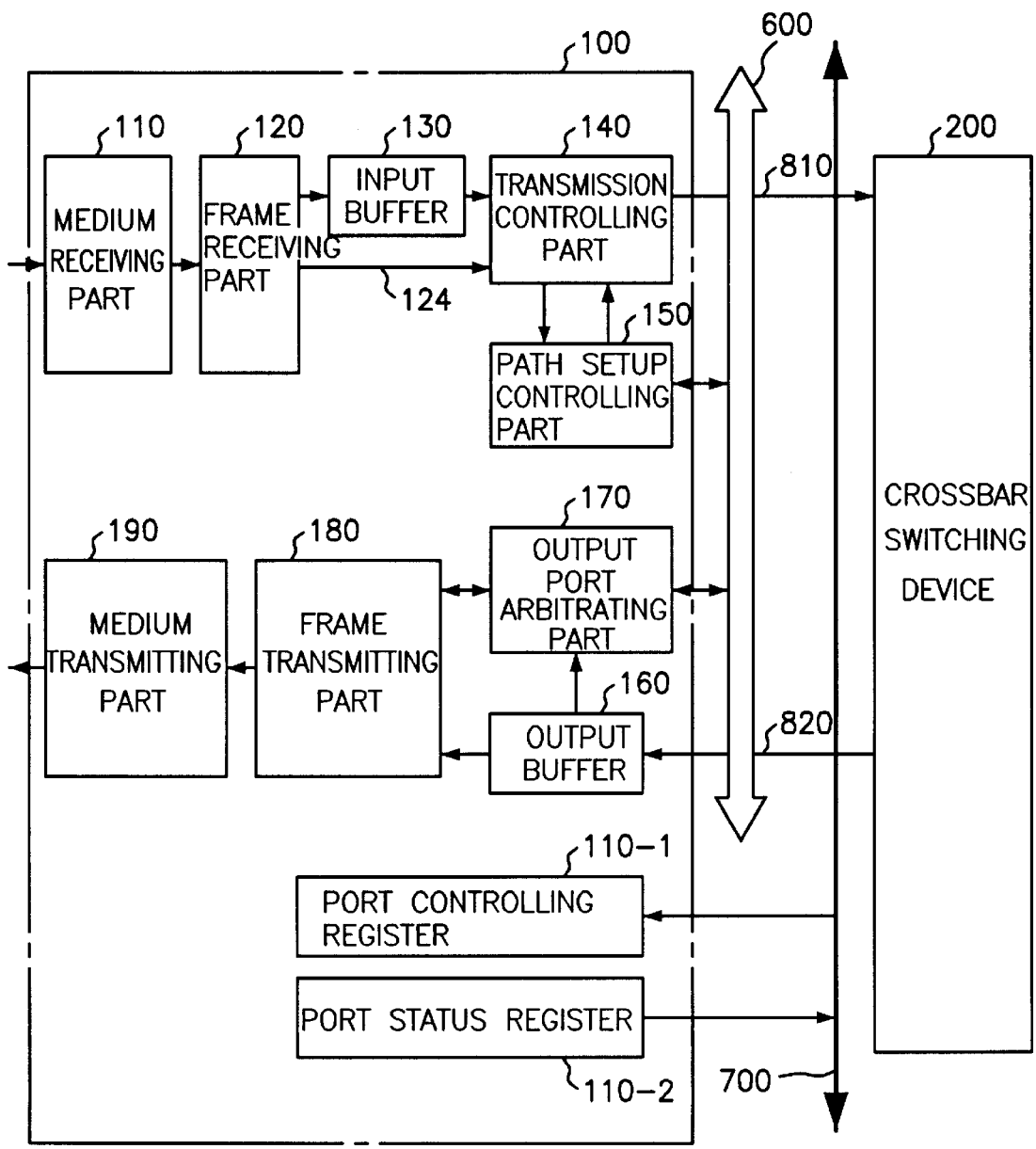
FIG. 2 is a block diagram of an input/output device of the invention.

Now turning to FIG. 2, the transmission link 30 includes a bi-directional serial transmission link. For its transmission media, optical fibers, Co-ax or Twister Pair can be used. For the optical fiber, a signal conversion function (generally, it is called a data link) between the optical signal and the electric signal is needed for a medium receiving part 110 and a medium transmitting part 190. The medium transmitting part 190 includes the functions of: coding the data in the transmission suitable coding method (for example, 8B/10B coding); converting the encoded parallel data into serial data, which is a general data link function; converting the electric signal into the optical signal when the transmission medium is the optical fiber; and inserting a special code for discriminating the transmission frame. The medium receiving part 110 includes the functions of: converting the transmitted serial data into parallel data; decoding the encoded signal; and decoding the special code and then discriminating the first and last points of the frame.

The frame received through the receiving transmission link and the medium receiving part 110 is stored in an input buffer unless the input buffer in the frame receiving part 120 is not in a full state. Here, the frame discriminating code specifically defined and received from the medium receiving part 110 is not received in the form of data. Therefore, the information of the frame discriminating code for discriminating the first and last points of the frame in the frame transmitting part 180 of the destination output port should be delivered through the crossbar switch path.

The internal frame discriminating device designates an additional bit for discriminating the frame to the delivered parallel data bits.

If the frame receiving part 120 recognizes the end of the frame, the part 120 displays the bit which indicates the end of the frame, stores it in the buffer and generates a frame arrival indicating signal 124 to the transmission controlling part 140.

If the transmission controlling part 140 recognizes the frame arrival indicating signal 124, the transmission controlling part 140 reads data from the input buffer 130, stores the header of the frame, and then requests a path setup of the path setup controlling part 150. Here, the number of the re-trial is initialized. When the path controlling response is received from the path setup controlling part 150, the response is processed according to the response type.

When the path controlling response is completed, the stored header is transmitted to the data channel 810. The remaining frame data in the input buffer 130 is transmitted through the data channel 810. When the end of the frame is sensed, the path release is requested to the path setup controlling part 150 to remove the set crossbar path. When the path controlling signal in response to the path release request is received, the next frame is processed.

The path setup controlling part 150 which received the path setup request performs the path setup request to the output port arbitrating part 170 of the destination port through the path controlling bus 600 according to the path setup requesting procedure. The path setup controlling part 150 transmits the response signal to the transmission controlling part 140 when receiving the path controlling response.

In the destination output port, the frame transmitting part 180 inserts the special transmission codes to discriminate the frame into the first and last points of the data frame stored in the output buffer 160, and the medium transmitting part 190 converts the data frame into the serial data for transmission, thereby transmitting the data through the transmission link. Here, the first and last points of the frame stored in the output buffer 160 are recognized by examining the specially defined additional bit. The data channel 810 includes the pure data bits, the signal for discriminating the first and last points of the frame, and a writing controlling signal for indicating the data writing timing.

A port status register 110-2 and port controlling register 110-1 are the devices for monitoring the states of the input/output device 100 from the system management device 400, and controlling the input/output device 100. Therefore, the system management device 400 can read and write through the system controlling bus 700.

Figure 3:
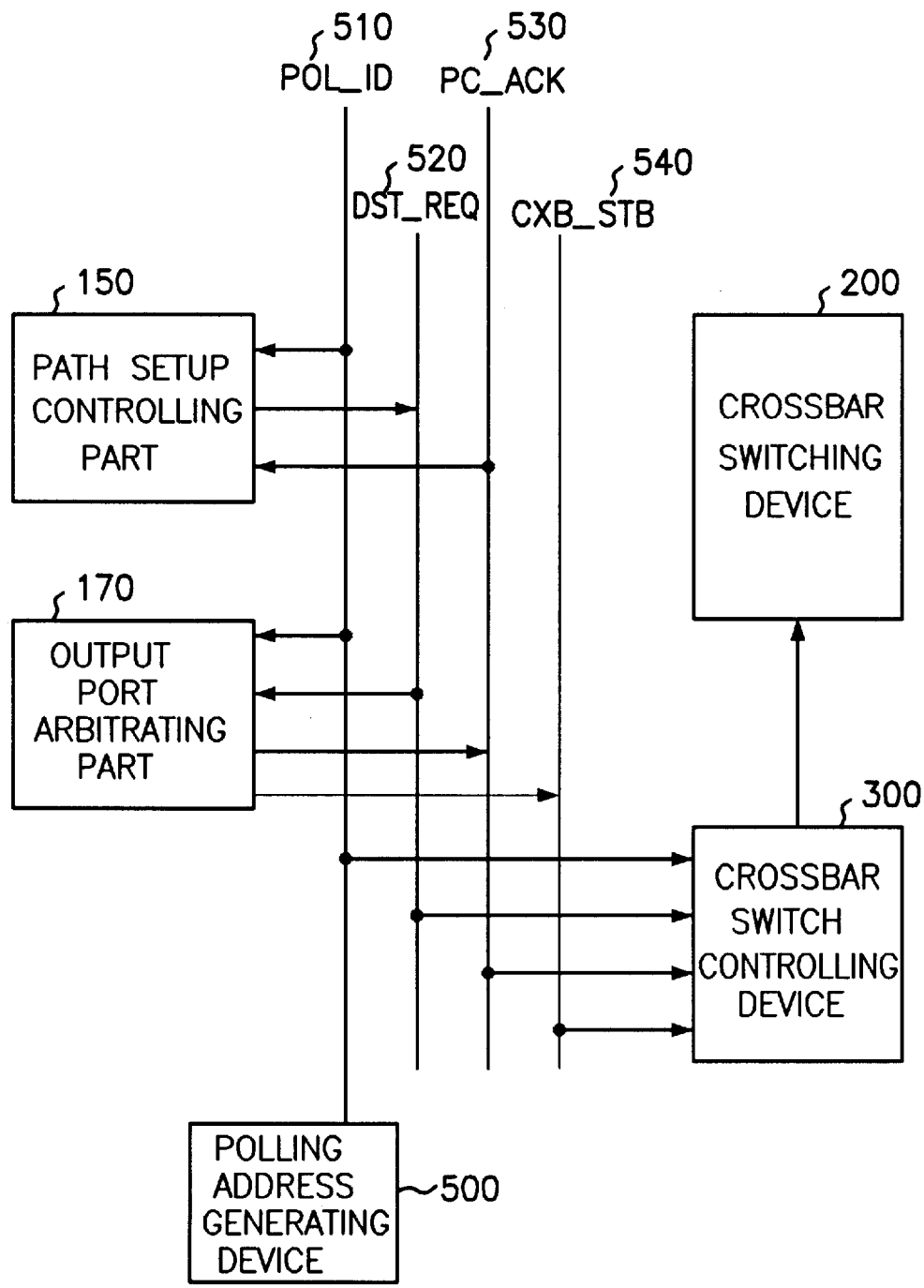
FIG. 3 is a block diagram of a path control bus of the invention.

FIG. 3 illustrates the path controlling bus 600 of the invention.

The path controlling bus 600 is a common shared bus serving as a connecting medium which delivers a path controlling request from the origination input port to the destination output port, and also delivers the response of the path controlling request to the corresponding input port. The polling port address signal POL-ID 510 indicates the address of the input port having the right to request path control in the next clock time slot. The POL-ID address 510 is generated according to the predetermined order of the polling address generating device 500.

The destination port address DST-REQ 520 is a bus signal indicating the address of the destination port and its request form (for example, a path setup request or path release request) in the corresponding path setup controlling part 150. The path setup controlling part 150 of the origination port loads the address of the destination port to be connected to the next cycle of the POL-ID time slot to the DST-REQ 520.

The path controlling response bus signal PC-ACK 530 is a bus signal in response to the path setup request from the output port arbitration part 170 of the destination port to the corresponding port. The path controlling response bus signal includes the bits which indicate a path controlling end, path setup rejection and output port use.

The crossbar strobe bus signal CXB-STB 540 controls the crossbar switch controlling device 300 when the PC-ACK bus signal 530 indicates positive acknowledgement. Here, when the path controlling request is the path setup request, the corresponding crossbar path is connected. When the path controlling request is the path release request, the corresponding crossbar path is broken down.

The path setup and release are performed through the path controlling bus as follows.

When the path setup controlling part 150 receives the path controlling request from the transmission controlling part 140, the part 150 loads the address of the destination port which is used for setting up/releasing the path in the next POL-ID 510 time slot, and the path controlling mode, namely the path setup request and path release request to DST-REQ 520. Meanwhile, the output port arbitration part 170 continually monitors the DST-REQ 520 bus signal. When the DST-REQ 520 equals to the address of that part 170, the part 170 examines the state of the output port. Thus, if the state renders it possible to set up the path, namely if the output port is not in use and the output buffer is not in the full state, the part 170 indicates the end of the path controlling operation to the PC-ACK 530 and thus responds to the path setup controlling part 150 of the corresponding origination port.

The corresponding PC-ACK signal 530 is asserted from the DST-REQ 520 after a predetermined time slot, the path setup controlling part 150 examines the PC-ACK bus signal 530 after a predetermined number of time slots from the time slot which requested the path setup.

In transmitting the PC-ACK 530 signal, the output port arbitration part 170 asserts the CXB-STB signal 540 to connect or cut down the corresponding path of the crossbar if the response displays the end of the path controlling operation, namely the end of the path setting up/releasing opeation.

The crossbar controlling device 300 generates a control signal to set up the corresponding path of the crossbar switching device 200 using the POL-ID 510 and DST-REQ 520 corresponding to the current latched CXT-STB if the CXB-STB signal 540 is asserted. Here, the POL-ID indicates the origination port, and DST-REQ indicates the destination port address, path setup request or path release request. That is, the crossbar switch controlling device 300 generates the crossbar controlling signal according to the information of the origination/destination ports, and the path setup or release request. The crossbar controlling signal includes a row address, a column address and writing controlling signal for a general common crossbar chip. The previous signal is latched in several stages to store POL-ID 510 and DST-REQ 520 corresponding to the current CXB-ATB 540.

When the DST-REQ bus signal 520 is examined in the output port arbitration part 170, the part 170 uses the logical address of each input/output device 100 as its address. This logical address is stored on the port controlling register 110-1 of each input/output device 100 by the system controlling device 400, and the output arbitration part 170 compares its port controlling register address with the address of the DST-REQ bus signal 520 at every time slot.

Figure 4A:
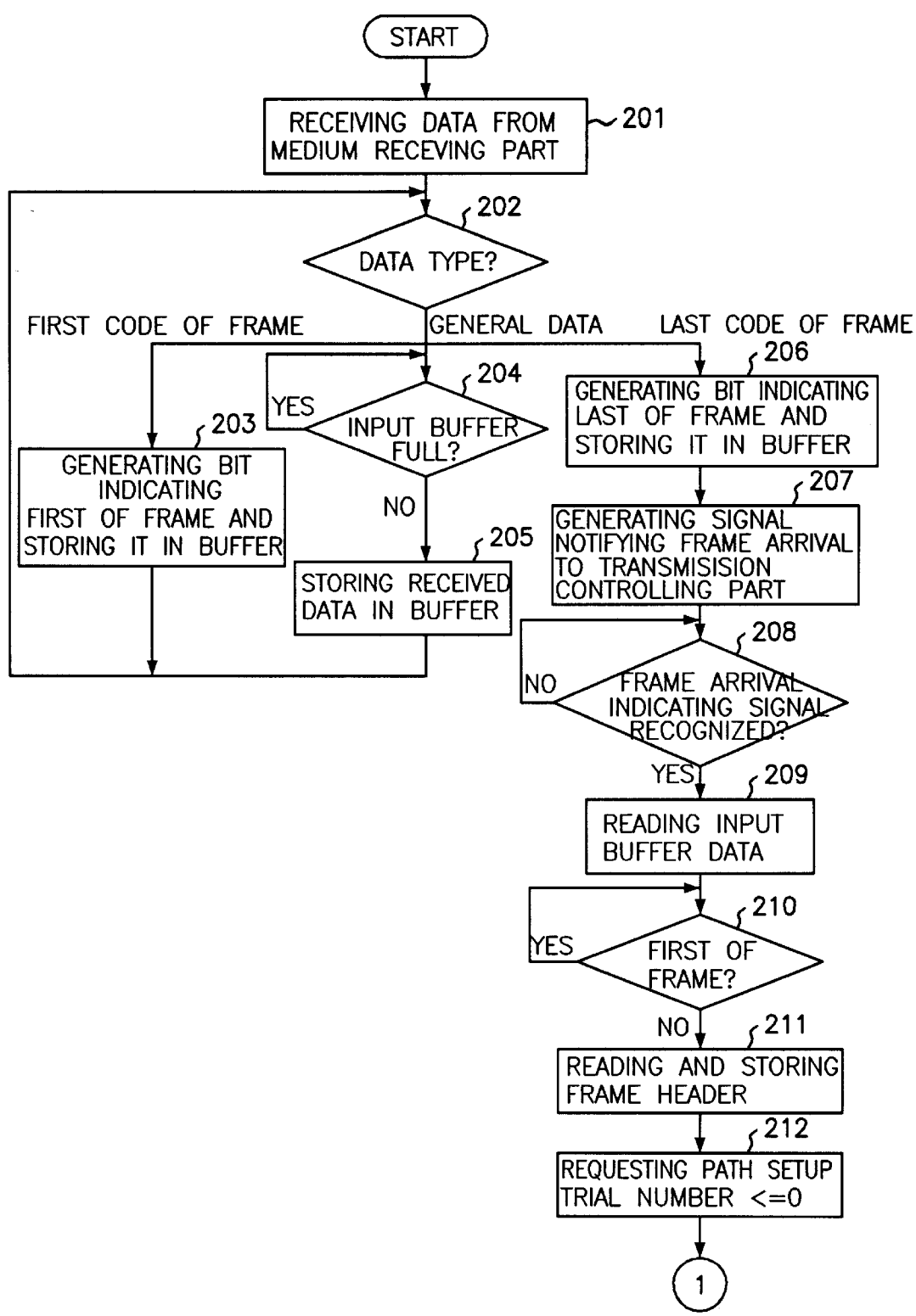
Figure 4C:
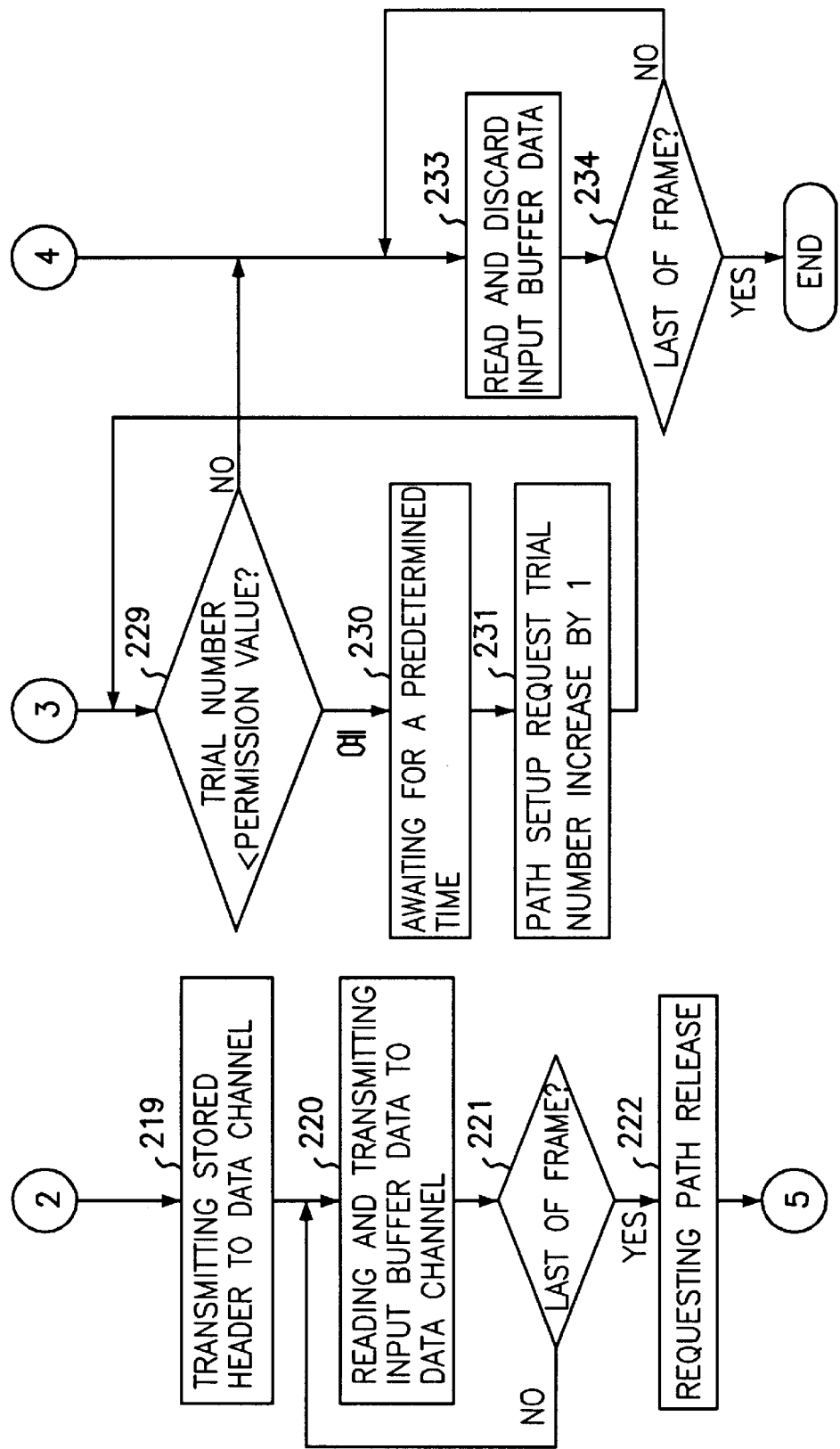
Figure 4D:
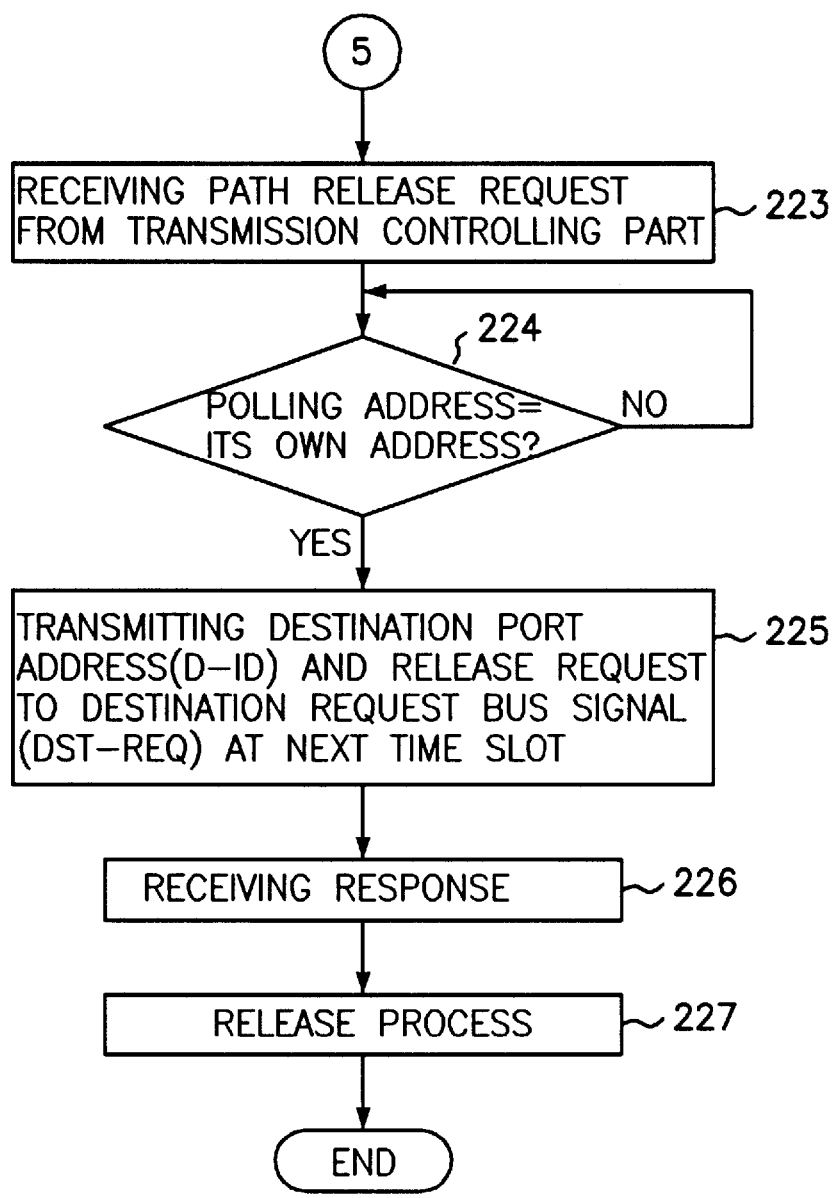

As illustrated in FIG. 4, the frame receiving part 120 receives data from the medium receiving part 110 in step 201. The part 120 apprehends the data type in step 202. If the data type is the first code of the frame, the part generates the bits indicating the start of the frame and then stores them in the buffer in step 203. If the data is general data, the part stores the received data in the buffer in step 205 when the buffer is not in the full state in step 204 by continually apprehending the data type. If the data is the last code of the frame, the part generates the bits indicating the end of the frame, stores them in the buffer in step 206, and then outputs the signal indicating the arrival of the frame to the transmission controlling part 140 in step 207.

If the transmission controlling part 140 recognizes the frame arrival indicating signal in step 208, reads the data stored in the input buffer in step 209, stores the frame header by reading the frame header in step 209 if the frame is not the start in step 210, requests the path setup to the path setup controlling part 150, and then initializes the trial number in step 212.

When the path setup request is received from the transmission controlling part 140 in step 213, the part 150 determines if the polling address is its own address or not in step 214, and then transmits the destination port address and setup request signal to the destination request bus signal DS-REQ in the next time slot in step 215 if the address is its own address.

When the response signal is received from the destination output port by waiting for the response time slot, the type of the response signal is determined in step 217. If the path controlling is completed, the end of the path controlling operation is notified in step 218. The transmission controlling part 140 receiving the signal indicating the end of the path controlling operation transmits the stored header to the data channel in step 219, reads the input buffer data, transmits it to the data channel in step 220, transmits until the last point of the frame in step 221, and requests a path release to the path setup controlling part 150.

When the path setup controlling part 150 receives the path release request from the transmission controlling part 140 in step 223, the part 150 determines if the polling address is its own address in step 224. When the polling address is its own, the part 150 transmits a release request to the destination request bus signal of the next time slot in step 225. When the response signal is input to the part 150 from the destination output port in step 226, the part 150 performs the releasing process in step 227.

When the path setup is requested and thus the response signal received from the destination output port indicates the use of the output port, the part 150 notifies the use of the output port to the transmission controlling part 140 in step 228. The transmission controlling part 140 determines if the path setup request trial number is smaller than the admission value in step 229. If the trial number is smaller than the admission value, the part 140 waits for a predetermined time in step 230 and then requests the path setup to the path setup controlling part 150. If the trial number is larger than the admission value, the input frame is discarded.

After the path setup is requested, the response signal received from the destination output port rejects the path setup, the path setup reject is notified to the transmission controlling part 140 in step 232. The transmission controlling part 140 reads the data stored in the input buffer till the last frame, discards it in step 233, and completes the operation in step 234.

Figure 5A:
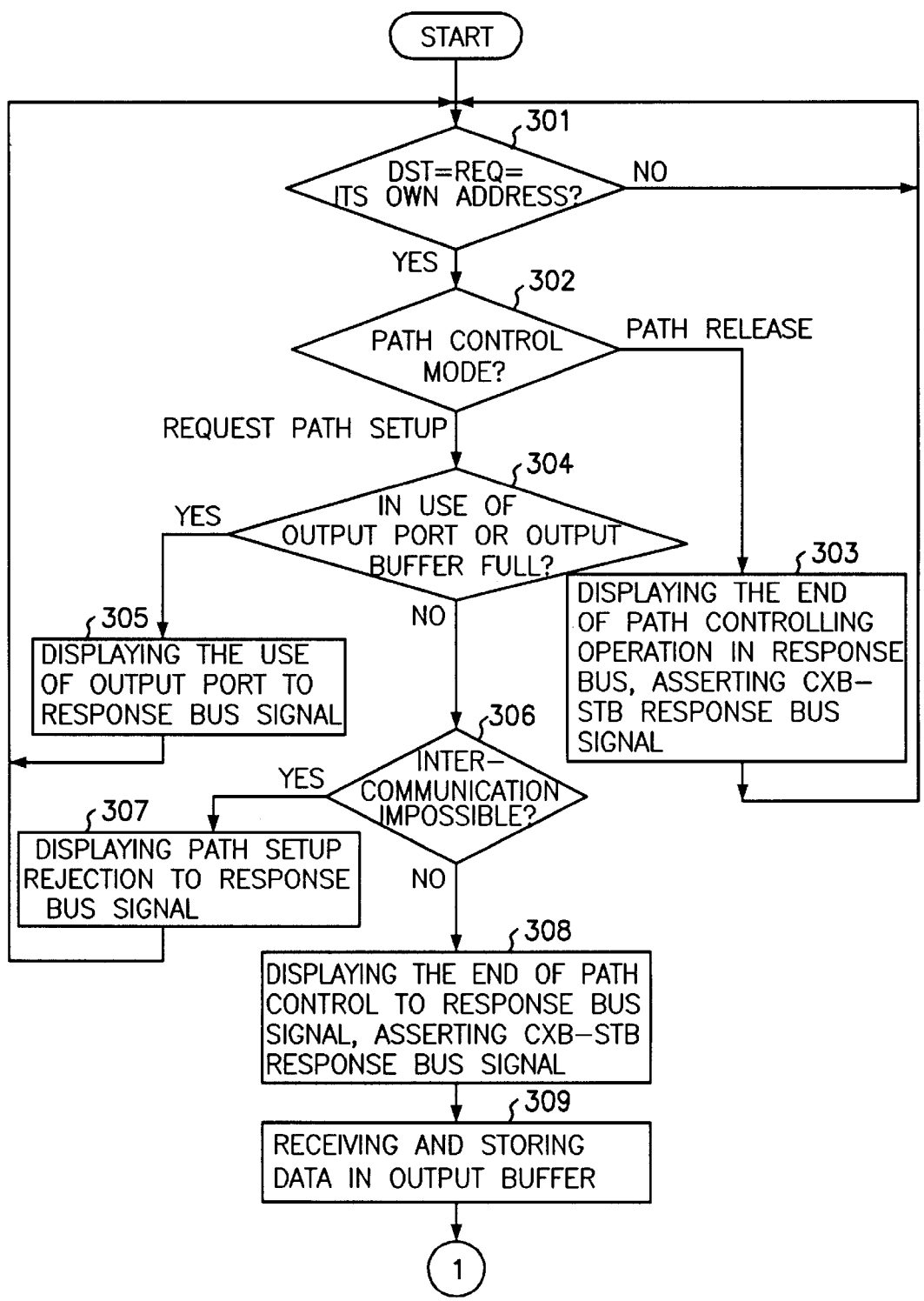
FIGS. 5A–5B are flowcharts showing a data receiving step according to the embodiment of the invention.
Figure 5B:
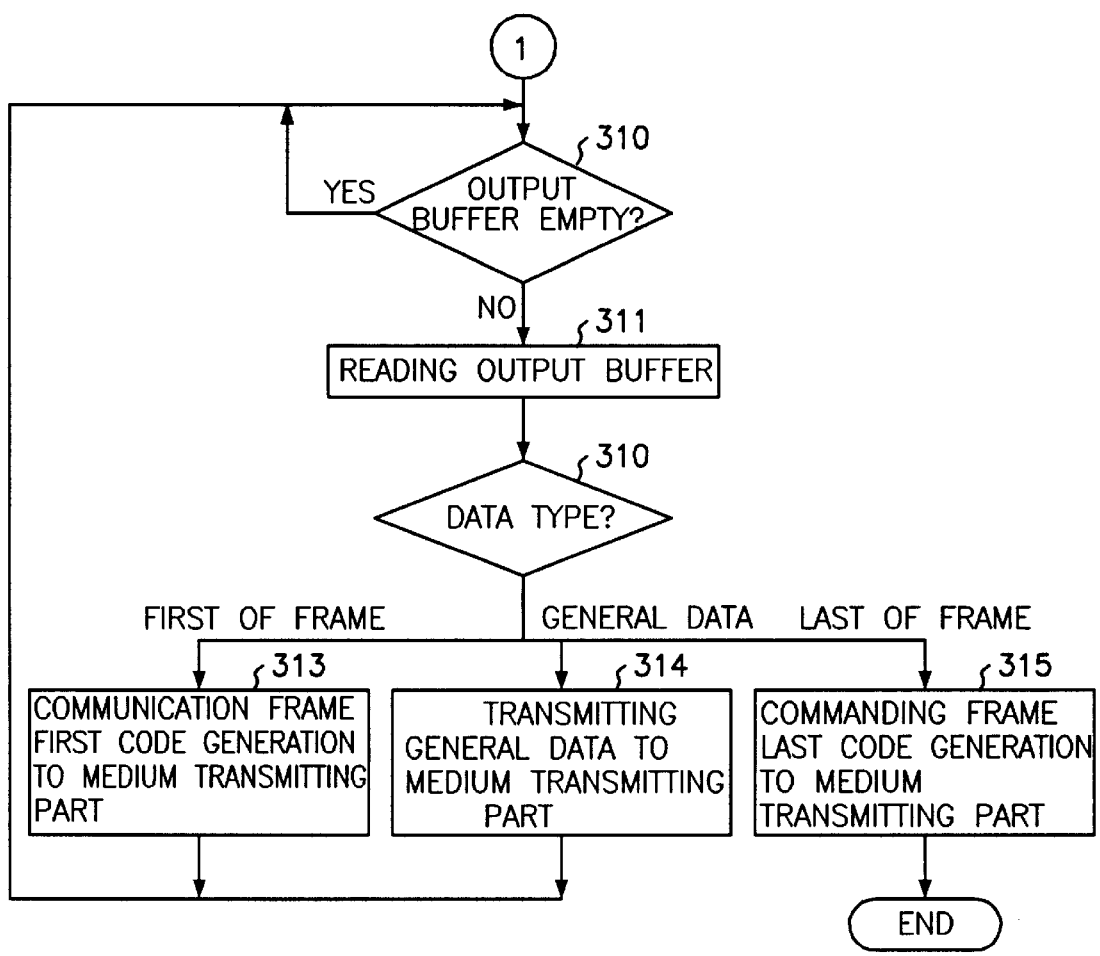

FIG. 5 is a flowchart showing a data receiving step according to one embodiment of the invention.

The output port arbitration part 170 examines the destination port address DST-REQ in step 301. The part 170 determines the path controlling mode if the address is its own port address in step 302. If the request is the path release request, the part 170 displays the end of the path controlling operation in the response bus, asserts CXB-STB response signal to the crossbar switch controlling device 300, and then returns to the initial state in step 303.

If the path control mode is the path setup request, the part 170 determines if the output port is in use or the output buffer is in a full state in step 304. If the output port is in use or the output buffer is in a full state, the part 170 displays the use of output port, notifies it to the path setup controlling part 150 of the origination input port in step 305, and then returns to the initial state. If the output port is not in use or the output buffer is not in a full state, the part determines if it is a communication channel unavailable state in step 306, transmits the path setup rejection to the response bus signal if the state is the communication channel unavailable state, and returns to the initial state in step 307.

If the communication channel is available, the part 170 indicates the end of the path controlling operation to the response bus signal and transmits it to the path setup controlling part 150 of the origination input port. The output port arbitration part 170 asserts the CXB-STB response bus signal to the crossbar switch controlling device 130 in step 308, the transmission controlling part sends the data through the path, and then stores the data in the output buffer in step 309. The frame transmitting part 180 reads the data stored in the output buffer in step 311, and thus determines the data type in step 312. If the data is the initial code of the frame, the part 180 transmits the frame initial code generation command to the medium transmitting part 190 with the data in step 313. If the data is the general data, the part 180 transmits the general data to the medium transmitting part 190. If the part receives the last code of the frame, the part 180 transmits the frame last code generation command to the medium transmitting part 190 in step 315, and completes the operation.

FIG. 6 illustrates the path control bus timing of the invention. The illustrated timing view may need an additional waiting time slot according to the realization environment. An operation of each time slot in the POL-ID time slot of the corresponding input port is described as follows.

its own POL-ID time slot:

In the path setup controlling part 150 of each input/output device 100 examines the POL-ID and then performs the path setup/path release requesting procedure if the POL-ID is its own POL-ID.

its own POL-ID time slot+1:

The destination port address (D-ID) for setting up/releasing path is loaded in DST-REQ. Here, if the request is the path setup request or the path release request is indicated in DST.REQ.

The respective output port arbitration part 170 examines the destination port address of DST-REQ and then examines the states of the output port and output buffer if the address is its own address.

its own POL-ID time slot+2+waiting time slot number:

The path setup end is transmitted to the corresponding request port through PC-ACK, or the output port use (BUSY) or path setup rejection (RJT) is also transmitted thereto.

Here, with the path setup end response, the output port arbitration part 170 asserts the CXB-STB signal to make the crossbar switch control device 300 generate the corresponding crossbar control signal. The MCLK is a common clock of the time slot cycle. MCLKN is a inverse signal of the MCLK. Therefore, the above timing view illustrates an example of using the rising clock of the MCLK and MCLKN.

The thus-operated invention has the following effects.

In the invention, the path setup/release request is performed by time-division polling, using the POL-ID 510 for path setup and release request in the input port, so that the number of the signal line for transmitting the signal between the path setup controlling part and output port arbitration part can be remarkably reduced.

The DST-REQ 520 uses the common shared bus line indicating the destination port address, and thus the system can be easily extended to the maximum address bit. However, when using the signal line specifically allotted in every port, the signal line should be extended in correspondance to the number of ports in order to extend the port number.

As a logical address regardless of the physical port change may be used as the destination port address used for the switch path control, the logical address of the input port does not have to be converted into the physical port address.

In the invention, as the input port is sequentially processed by POL-ID and the corresponding crossbar switch is controlled after a predetermined period of time slot from the path setup and release request, so that the invention needs not an additional arbiter for solving the collision in the crossbar switch controlling device for a commercially crossbar chip which control the crosspoint sequentially.

It will be apparent to those skilled in the art that various modifications and variations can be made in the data transmitting/receiving method using distributed path control in a data switching system of the present invention without departing from the spirit or scope of the invention. Thus, it is intended that the present invention cover the modifications and variations of this invention provided they come within the scope of the appended claims and their equivalents.

What is claimed:

1. A data transmitting/receiving method using a distributed path control in data switching system with a plurality of communication ports, said method comprising the steps of:

(1) storing data by discriminating a first code and a last code of a received data frame, and then reading and storing a frame header, requesting a path setting and then initializing a trial number, transmitting a setup request signal in a next time slot with a destination output port address if a polling address corresponds to an input port address, and thus transmitting the stored header through a data channel when a response signal received from said destination output port indicates an end of a path controlling operation, and transmitting data stored in an input buffer to the end of a frame and requesting a path release at the polling address;

2) releasing said path in response to a path release request when said destination output port address corresponds to the destination output port address, if said destination output port is not in use and an output buffer is not in a full state, and a communication channel is available, indicating the end of the path controlling operation in a response bus in response to said path setup request and receiving a frame through the path to discriminate an initial code and last code of said frame, thereby transmitting said data;

wherein said step (1) further comprises the steps of:

(3) receiving and storing data in said input buffer by discriminating said first and last code of said frame, notifying the arrival of said frame, reading the frame header of said data stored in said input buffer by recognizing the arrival of said frames requesting the path setup and initializing the trial number to determine if said polling address corresponds to the input port address, (4) transmitting said destination output port address and said path setup request at the next time slot if said polling address corresponds to the input port address in said step (3), and then waiting until said response time slot to examine the response signal received from said destination output port, (5) transmitting said header data and another data stored in said input buffer to the end of said frame when said response signal indicates the end of the path controlling operation in said step (4) in order to release said path by requesting said path release at the polling address, (6) comparing values of the trial number when said response signal is an output port busy signal in said step (4) and thus requesting a path setup after a predetermined time if said value of the trial number is smaller than a permissible value and increasing the trial number, and (7) discarding data stored in said input buffer when said response signal is a path setup rejection signal in said step (4).

2. The method as claimed in claim 1, wherein said (3) step further comprises the steps of:

(8) determining the type of data by receiving data from a medium receiving part; and (9) generating bits indicating an end of said frame when said data type is an initial code of said frame in said step (8) and storing it in said buffer, continuously determining the type of input data, and storing said received data in said buffer when said data is general data and not in a full state, continuously determining the type of input data, generating bits indicating the end of said frame when it is a last code of said frame and storing the generated bits in said input buffer;

outputting a signal indicating the arrival of said frame to a transmission controlling part, recognizing said frame arrival indicating signal by said transmission controlling part, and reading data stored in said input buffer, reading and storing said frame header when said frame is an initial frame, requesting the path setup to said path setup controlling part, initializing the trial number, and receiving said path setup request by said path setup controlling part and thus determining if said polling address corresponds to the input port address.

3. The method as claimed in claim 1, wherein said step (5) further comprises the steps of:

(8) notifying the end of the path controlling operation to said transmission controlling part when said signal indicates the end of the path controlling operation, transmitting said stored header and said input buffer data by said transmission control part receiving said path control ending signal to the end of said frame, requesting a path release to a path setup control part by said transmission controlling part, and determining if a polling address corresponds to the input port address then said path release request is received from said transmission controlling part by said path setup controlling part; and (9) transmitting a release request to a destination request bus signal at the next time slot if said address is the address of said path setup controlling part in said step (8), and thus performing said releasing process if a response is received from said destination output port.

4. A data transmitting/receiving method using a distributed path control in data switching system with a plurality of communication ports, said method comprising the steps of:

(1) storing data by discriminating a first code and a last code of a received data frame, and then reading and storing a frame header, requesting a path setting and then initializing a trial number, transmitting a setup request signal in a next time slot with a destination output port address if a polling address corresponds to an origination input port address, and thus transmitting the stored frame header through a data channel when the response signal received from a destination output port indicates an end of the path controlling operations and transmitting data stored in an input buffer to the end of a frame and requesting a path release at the polling address; and 2) releasing said path in response to a path release request when the port address corresponds to said destination output port address and if said destination output port is not in use and an output buffer is not in a full state, and a communication channel is available, indicating the end of the path controlling operation in a response bus in response to said path setup request and receiving a frame through the path to discriminate an initial code and last code of said frame, thereby transmitting said data, wherein said step (2) further comprises the steps of:

(3) examining a destination port address and determining a path control mode if said destination port address is the port address of an output port arbitration part, using said output port arbitration part;

(4) indicating an end of the path controlling operation in a response bus if said request of step (3) is a path release request, asserting a crossbar strobe (CXB-STB) response bus signal to said crossbar switch control means, returning to an initial state, determining if said output port is in an output port using mode or if said output buffer is in a full state when said path control mode is a path setup request;

(5) indicating a busy state of said output port in said response bus signal when said output port of said step (4) is in use or said output buffer is in a full state, and so notifying said path setup controlling part of an origination input port, returning to an initial state, and determining if said output port is in a communication channel unavailable state when said output buffer is not in a full state;

(6) transmitting said response bus signal by indicating a path setup rejection if said communication in unavailable in said step (5), transmitting said response bus signal by displaying an end of the path controlling operation to said path setup control part of said origination input port if said communication is available, receiving data through the path set up by asserting said CXB-STB response bus signal to said crossbar switch control means and storing them to said output buffer, and determining the type of data by reading data stored in said output buffer by said frame transmission part; and (7) transmitting a frame initial code generation command to a medium transmitting part with data if said data is a frame initial code, transmitting normal data to said medium transmitting part if said data are normal data, and transmitting the frame last code generation command to said medium transmitting part when said end code of said frame is received.

* * * * *